US009186600B2

(12) United States Patent
Alzner et al.

(10) Patent No.: US 9,186,600 B2
(45) Date of Patent: Nov. 17, 2015

(54) DEVICE FOR BRINGING ABOUT A PHASE CONTACT BETWEEN A LIQUID PHASE AND A GASEOUS PHASE, IN PARTICULAR A HEAT AND MASS TRANSFER COLUMN

(71) Applicant: LINDE AKTIENGESELLSCHAFT, Munich (DE)

(72) Inventors: Gerhard Alzner, Munich (DE); Christian Matten, Pullach (DE); Ludwig Bauer, Tauberfeld (DE); Mariyana Chalakova, Munich (DE); Thomas Walter, Munich (DE); Manh-Hung Nguyen, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 294 days.

(21) Appl. No.: 13/668,674

(22) Filed: Nov. 5, 2012

(65) Prior Publication Data
US 2013/0113128 A1    May 9, 2013

(30) Foreign Application Priority Data
Nov. 3, 2011    (DE) .......................... 10 2011 117 588

(51) Int. Cl.
*B01D 3/32* (2006.01)
*B01D 3/22* (2006.01)
(52) U.S. Cl.
CPC . *B01D 3/324* (2013.01); *B01D 3/22* (2013.01)
(58) Field of Classification Search
CPC .......... B01D 3/22; B01D 3/225; B01D 3/141; B01D 3/14; B01D 3/324
See application file for complete search history.

(56) References Cited

U.S. PATENT DOCUMENTS

| 1,723,748 | A | * | 8/1929 | Primrose | 208/359 |
| 2,306,367 | A | * | 12/1942 | Benson et al. | 261/113 |
| 2,317,449 | A | * | 4/1943 | Flock | 422/49 |

(Continued)

FOREIGN PATENT DOCUMENTS

| CH | 302526 A | 1/1955 |
| DE | 903447 B | 7/1949 |

(Continued)

OTHER PUBLICATIONS

English Translation Abstract of DE 19543049 A1 published May 7, 1997.

*Primary Examiner* — Duane Smith
*Assistant Examiner* — Stephen Hobson
(74) *Attorney, Agent, or Firm* — Millen, White, Zelano, Branigan, P.C.

(57) ABSTRACT

The invention relates to a device (column) for bringing about a phase contact between a liquid phase and a gaseous phase, in particular a material exchange column, comprising: a shell, which extends along a longitudinal axis and bounds a shell space, at least a first circular tray, arranged in the shell space, for taking up the liquid phase, which extends crosswise to the longitudinal axis, whereby the at least one first tray has through openings for passage of a gaseous phase, so that the gaseous phase can come into phase contact with the liquid phase that is located on the at least one first tray. According to the invention, a large number of sealing weirs projecting from the first tray along the longitudinal axis are provided, which extend in each case along a radial direction of the at least one first tray, so that the first tray is divided into a corresponding plurality of sectors. In addition, the invention relates to an apparatus comprising such a device and a floatable carrier.

33 Claims, 13 Drawing Sheets

(56) References Cited

U.S. PATENT DOCUMENTS

| | | | | |
|---|---|---|---|---|
| 2,319,814 | A * | 5/1943 | Harmon | 261/113 |
| 2,327,045 | A * | 8/1943 | Huff | 422/638 |
| 2,420,242 | A * | 5/1947 | Harmon | 261/113 |
| 2,457,658 | A * | 12/1948 | Graham | 261/113 |
| 2,582,826 | A * | 1/1952 | Glitsch | 52/246 |
| 2,645,607 | A * | 7/1953 | Allen | 196/111 |
| 2,664,280 | A * | 12/1953 | Kohn | 261/114.5 |
| 2,752,138 | A * | 6/1956 | Kittel | 261/113 |
| 2,779,577 | A * | 1/1957 | Olney et al. | 261/113 |
| 2,780,362 | A * | 2/1957 | Sabi | 210/522 |
| 2,809,820 | A * | 10/1957 | Stoops | 261/106 |
| 3,017,950 | A * | 1/1962 | Koshoot | 202/158 |
| 3,022,054 | A * | 2/1962 | Kotzebue | 261/114.4 |
| 3,045,989 | A * | 7/1962 | Kittel | 261/114.3 |
| 3,338,566 | A * | 8/1967 | Kittel | 261/113 |
| 3,467,365 | A * | 9/1969 | Webster | 261/114.3 |
| 3,642,258 | A * | 2/1972 | Stahl et al. | 261/113 |
| 3,723,072 | A * | 3/1973 | Carson et al. | 261/94 |
| 3,814,397 | A * | 6/1974 | Geist et al. | 261/114.1 |
| 3,914,352 | A * | 10/1975 | Guerrieri | 261/114.5 |
| 4,129,626 | A * | 12/1978 | Mellbom | 261/114.3 |
| 4,295,966 | A * | 10/1981 | LeBlanc et al. | 210/180 |
| 4,311,564 | A * | 1/1982 | Aldridge | 203/99 |
| 4,378,292 | A * | 3/1983 | Haase | 210/266 |
| 4,404,086 | A * | 9/1983 | Oltrogge | 208/408 |
| 4,556,522 | A * | 12/1985 | Wilson | 261/114.1 |
| 5,627,041 | A * | 5/1997 | Shartle | 435/7.24 |
| 5,756,048 | A * | 5/1998 | Zardi et al. | 422/49 |
| 5,916,529 | A * | 6/1999 | Scheuerman | 422/141 |
| 6,024,871 | A * | 2/2000 | Harter et al. | 210/198.2 |
| 6,338,828 | B1 * | 1/2002 | Stupin et al. | 422/224 |
| 6,881,387 | B1 * | 4/2005 | Jacobs et al. | 422/224 |
| 7,258,328 | B2 * | 8/2007 | Lee | 261/97 |
| 2004/0130041 | A1 * | 7/2004 | Resetarits et al. | 261/79.2 |
| 2004/0212105 | A1 * | 10/2004 | Coney | 261/79.2 |
| 2005/0121303 | A1 * | 6/2005 | de Graauw et al. | 203/2 |
| 2006/0260926 | A1 * | 11/2006 | Kovak | 202/266 |
| 2009/0032980 | A1 * | 2/2009 | Alzner | 261/35 |
| 2009/0256270 | A1 * | 10/2009 | Griepsma | 261/114.5 |
| 2012/0175792 | A1 * | 7/2012 | Nieuwoudt | 261/128 |
| 2012/0241006 | A1 * | 9/2012 | Chen et al. | 137/1 |
| 2015/0166455 | A1 * | 6/2015 | Hammon et al. | |

FOREIGN PATENT DOCUMENTS

| | | | | |
|---|---|---|---|---|
| DE | | 19543049 | A1 | 5/1997 |
| GB | | 66862 | * | 4/1952 |
| GB | | 719197 | A | 11/1954 |
| WO | | 00/10696 | A1 | 3/2000 |
| WO | WO 2010002383 | A1 * | 1/2010 | B01D 15/14 |
| WO | WO 2013182268 | A1 * | 12/2013 | |

* cited by examiner

DEVICE FOR BRINGING ABOUT A PHASE CONTACT BETWEEN A LIQUID PHASE AND A GASEOUS PHASE, IN PARTICULAR A HEAT AND MASS TRANSFER COLUMN

SUMMARY OF THE INVENTION

The invention relates to a device for bringing about a phase contact between a liquid phase and a gaseous phase, in particular in the form of a heat and mass transfer column comprising a jacket or shell, which extends along a longitudinal axis and bounds a jacket or shell space, and at least a first tray, arranged in the shell space, for taking up the liquid phase. The tray, which extends crosswise to the longitudinal axis, has through openings for passage of the gaseous phase, so that the latter can come into phase contact with the liquid phase located on the at least one first tray.

Such a device generally has a (pressurized) shell, which extends along a longitudinal axis and bounds a shell space, wherein the longitudinal axis coincides with the vertical in particular in a device that is arranged as directed. The device also has at least one circular first tray arranged in the shell space, which tray is set up and provided for the purpose of being exposed to or coated with a liquid phase, and which tray extends perpendicular to the longitudinal axis. The at least one first tray is provided with through openings to allow passage of a gaseous phase, so that the latter can come into phase contact with the liquid phase that is located on the tray. The at least one first tray is arranged, in particular, coaxially with the shell in the shell space.

Such devices (columns) for material and heat exchange between a gaseous phase and a liquid phase (material exchange columns) are known for numerous processing applications and are used both in on-shore plants and in off-shore plants. For bringing about the phase contact, it is conventional for the columns to contain either trays or ballast fillers such as random or structured packings positioned on one support tray (e.g., Sulzer Mellapak, Raschig rings, Berl saddles, Intalox saddles, Pall rings, etc.).

In columns with trays, there are a number of configurations. In this connection, tray configurations can be grouped into several categories, e.g., cross-current, tangential-current, and radial-current trays. Each of these categories exhibits a characteristic liquid phase flow direction. With the cross-current tray, the latter is oriented parallel to a circular axis and can be divided into different flow paths. With the tangential-current trays, the liquid is directed into an annular space tangentially around a central pipe, whereby this annular space can be divided into various partial segments. The direction of flow in a radial tray runs centrically from a central area of the tray outward (to the shell) or from the outside to the central area (middle) of the tray.

Under certain conditions, it is necessary to use the above-mentioned tray as a heat and mass transfer device in columns. This applies, e.g., when the amount of the liquid phase is small in comparison to the amount of the gaseous phase. In this case, the use of a structured packing or other components is unfavorable, since a uniform distribution of the amount of liquid, which is small in any case and which is necessary for the effectiveness of the exchange element, is extremely difficult or impossible to achieve.

Conventional trays are designed for use in on-shore plants, i.e., plants built on the mainland, and require that when the plant is in operation, all tray components are oriented horizontally level within a certain tolerance (e.g., less than 5 mm) in order to ensure a uniformly high liquid layer and an associated uniform gas distribution. Otherwise, an improper distribution of the gas phase and/or liquid phase can occur, which can result in a reduced material transfer and thus a reduced separation efficiency of the column.

In off-shore plants (i.e., plants that are built on vessels or floating bases, in particular platforms), it cannot be ensured, because of the movements of the carrier (vessel, platform, etc.) that when the plant is in operation, the trays are always oriented horizontally level. Rather, it must be assumed that the trays correspond to the movement of the carrier and thus the column shells are not located in the horizontal. Thus, use of conventional trays in off-shore plants is extremely problematic.

On this basis, an aspect of this invention is therefore to suitably modify a device or arrangement of the above-mentioned type in such a way that there is a high tolerance relative to the deviations of the trays from the horizontal (horizontal position).

Upon further study of the specification and appended claims, other aspects and advantages of the invention will become apparent.

These aspects are achieved by a column of the above-mentioned type wherein the column is provided with a large number of sealing weirs projecting from the first tray along the longitudinal axis. These sealing weirs extend in each case along a radial direction of the first tray, so that the first tray is divided into a corresponding large number of sectors.

Accordingly, a large number of sealing weirs projecting from the at least one first tray along the longitudinal axis are provided, which weirs extend in each case along a radial direction of the at least one first tray (radial tray), so that the at least one first tray is divided into a corresponding large number of essentially pie-wedge-shaped sectors (circular sectors). In each of these sectors, the liquid phase can be directed along a radial direction either toward the shell or away from the shell, so that in particular in an inclined position of the at least one first tray, which usually occurs in the case of floating carriers and is smaller than a predefinable maximum inclined position, the sectors of the at least one first tray do not dry out and no drizzling onto a lower tray takes place.

The measure according to the invention, advantageously in an inclined position, counteracts the fact that the entire liquid phase (liquid) located on the at least one first tray will collect in the lowered area (as a result of the incline) of the first tray and drizzling (so-called "weeping") onto an underlying additional tray occurring there. At the same time, the area of the at least one first tray that is raised by the inclined position is prevented from drying out (which would mean that gas/liquid phase contact would no longer occur in this area). The number of sealing weirs and thus the size of the individual sectors, which results from the cross-sectional surface of the column or the surface of the tray divided by the number of sealing weirs, is selected based on the column diameter and the extent of movement that is to be expected (e.g., the expected extent of movement of the ship or platform). It is the aim here in particular to preclude a drying-out of a tray part within a (circular) sector of at least a first tray and thereby prevent a gas break-through.

For this purpose, the sealing weirs in each case are preferably extended, in particular in liquid-tight manner, all the way along the assigned radial direction starting from a central area of the first tray to an outermost circumferential edge of the first tray, so that over the entire length of a sealing weir, the liquid phase that is located in one sector cannot pass directly into the adjacent sectors.

In addition, to calm the liquid phase (in radial direction or direction of flow) in the individual sectors, in each case weirs are provided that extend in each case preferably crosswise to the direction of flow of the liquid phase in the respective sector between two adjacent sealing weirs, which define the sector in question. In this case, the weirs in each case extend concentrically to the shell of the device (column) or parallel to a (horizontal) tangential direction of the shell or the first tray. Such weirs are preferably designed as underflow weirs or as through weirs. In this case, an underflow weir forms a slot between the at least one first tray and the underflow weir, through which slot the liquid phase can flow from the one side of the underflow weir (going under the underflow weir) to the other side of the underflow weir. A through weir, however, has at least one through opening, preferably a large number of through openings, whose size can decrease upward, i.e., through openings (holes) that lie further above along the longitudinal axis, have a smaller inside diameter than through openings of the through weir located thereunder along the longitudinal axis.

For bringing about a phase contact between the liquid phase that is located on the tray and the gaseous phase that goes through the first tray, the at least one first tray can have a sieve tray as a heat and mass transfer element, which has a large number of through openings arranged particularly in regular fashion. In this case, the through openings are preferably dimensioned so that a so-called froth or foam layer is formed on the at least one first tray or in the individual sections in which intensive phase contact takes place between the liquid phase and the gaseous phase.

As an alternative to this, the at least one first tray can have bubble caps or chimney bubble caps (chimney neck bells) as heat and mass transfer elements, i.e., from which in each case a circumferential chimney neck extends the edge areas bordering the through openings, which neck in each case is covered by an assigned chimney cap. In this case, the chimney caps extend in each case with a lower circumferential edge area down to the first tray, whereby in each case a large number of parallel gas slots, extended along the longitudinal axis, are made in particular on the circumferential lower edge areas of the chimney caps, through which slots the gaseous phase can flow over the respective chimney neck into the liquid phase that stands on the at least one first tray. Instead of the gas slots, a circumferential gas gap can be provided between a lower edge area of the respective chimney cap and the first tray. Furthermore, in addition to the gas gap, in turn gas slots can be provided on the lower edge area, so that the lower edge area of the respective chimney cap has a jagged outline.

In this case, the upper edges of the gas slots and/or the respective (circumferential) gas gap defined along the longitudinal axis are preferably arranged below an upper edge of the chimney neck assigned in each case, so that in particular at least up to a pre-definable maximum inclined position of the at least one first tray (relative to the horizontal) is ensured so that the gas slots or the gas gaps of a chimney neck bell, when the device is operated as directed, are overlapped with the liquid phase.

In addition, in a variation of the invention, it is provided that at least one first tray has a center downcomer positioned in the middle on the first tray, via which the liquid phase can flow onto a second tray that is arranged below the first tray, whereby the center downcomer is bordered in particular by a circumferential outlet or draining weir that projects from the first tray. In this case, the sealing weirs in each case preferably run all the way along the assigned radial direction of the outlet weir, in particular liquid-tight, to an outermost circumferential edge of the at least one first tray.

In addition, the center downcomer preferably has a circumferential wall extended along the longitudinal axis as well as a shaft base bounding the center downcomer downward. Preferably, the center downcomer, relative to a cross-sectional plane extended perpendicular to the longitudinal axis, has a circular or polygonal contour, whereby in particular in a polygonal cross-sectional contour, the wall of the center downcomer has a corresponding large number of flat sections, whereby two sections each are connected to one another while forming a corner, which extends along the longitudinal axis, of the polygonal wall in the cross-section.

In this case, the sealing weirs in each case preferably extend from one assigned corner each of the polygonal wall and extend along a radial direction to the shell.

To be able to pass the liquid phase to a second tray, arranged below the first tray in the shell space, the center downcomer preferably has a large number of distribution openings (distribution holes). Preferably, the distribution openings are provided along a circumferential lower area of the wall of the center downcomer on the wall or are formed adjacent to one another in the shaft base of the center downcomer, so that they are open downward along the longitudinal axis (vertical).

In order to be able to direct the liquid phase that is fed to the second tray specifically to certain areas of the second tray, distribution pipes or channels are provided that are preferably connected to the distribution openings or extend therefrom. In each case, the distribution pipes or channels extend radially outward to the shell, in particular starting from the center downcomer. In this case, the distribution pipes in each case tilt relative to the horizontal, so that they in each case descend towards the shell. Preferably, the free ends of the distribution pipes are arranged in each case along the longitudinal axis above a feed area of the second tray that is arranged below the first tray, so that the liquid phase that emerges on the free ends of the distribution pipes drops into the respective feed area of the second tray, from which it is further distributed via the sector of the second tray assigned to the respective feed area.

The first tray in its sectors along an outermost circumferential edge preferably has one inlet or feed weir each or a side wall, which divides a feed area of the above-mentioned type from the respective sector, via which the respective sector can be coated with the liquid phase. In this connection, the feed weirs (side walls) in each case preferably extend crosswise to the direction of flow of the liquid phase between two sealing weirs bounding the respective sector. In this case, the feed weirs (side walls) in each case can be designed concentrically to the shell or run parallel to a horizontal, tangential direction of the shell or the first tray. To coat the respective sector with the liquid phase that flows into the respective feed area, the side walls ("false downcomer") in each case can have a large number of through openings on a lower area (area connected to the first tray), which through openings can assume in particular the shape of slots.

As alternatives to a center downcomer, the first tray can also have an outside downcomer (outside shaft) that extends around, along the shell, via which the liquid phase can flow onto a second tray arranged below the first tray. In this case, the outside downcomer is preferably divided by the sealing weirs into outside downcomer segments, which are assigned in each case to a sector, i.e., the sealing weirs are directed into the outside downcomer. In addition, the outside downcomer segments are preferably bounded in each case by the shell and an outside downcomer wall, whereby the outside downcomer walls in each case preferably form a draining weir on an upper end relative to the longitudinal axis (vertical), via which draining weir the liquid phase can flow or drop into the respective outside downcomer segment. In addition, the outside downcomer walls in each case have at least one through opening on a lower edge area, which through opening in particular is bounded by the lower edge area and a second tray that is arranged below the first tray, so that the through opening in particular has the shape of a (horizontally running) gap. The liquid phase can pass from the respective outside downcomer segment to the second tray via the at least one through opening.

The device preferably has a second circular (disk-shaped) tray that is arranged in the shell space along the longitudinal axis below the first tray, which second tray is set up and provided for the purpose of being exposed to or coated with the liquid phase, and which extends crosswise (perpendicular) to the longitudinal axis. In particular, the second tray also has through openings for passage of the gaseous phase, so that the latter can come into phase contact with the liquid phase that is located on the second tray. In turn, preferably a large number of sealing weirs projecting from the tray along the longitudinal axis are provided, which in each case extend along a radial direction of the second tray. As a result, the second tray is also divided into a corresponding large number of sectors (circular sectors) that are essentially pie-wedge-shaped, in which the liquid phase in each case can be directed along a radial direction to the shell or away from the shell (radial trays). In this case, it can be provided in particular that the first tray has a center downcomer, and the second tray has an outside downcomer, or that the first tray has an outside downcomer and the second tray has a center downcomer, or that the first and second trays in each case have a center downcomer. Of course, the device according to the invention can have a large number of trays of the above-mentioned type, which alternately have a center downcomer and an outside downcomer, e.g., along the longitudinal axis, or which all together in each case have a center downcomer.

If the trays alternately have a center downcomer and an outside downcomer, the liquid phase flows to a tray with a center downcomer from the shell to the center of the tray in the center downcomer and from the tray in each case arranged thereunder from the center outward to the shell, where the outside downcomer is arranged, via which the liquid phase can pass to the next tray. If, however, only center downcomers are present, the liquid phase flows onto all trays, in each case from the outside inward.

In one variant of the invention, it is provided that the sealing weirs of a first tray in each case align with an assigned sealing weir of a second tray arranged thereunder. In an alternative variant of the invention, however, it is provided that the sealing weirs of a first tray are arranged at a certain angle (any angle smaller than the segment angle is conceivable in this case) offset to the sealing weirs of a second tray, whereby in particular the sealing weirs of the respective second tray are arranged along the bisector of the angle of a subjacent sector of the respective first tray. This represents an especially advantageous arrangement.

In addition, the invention relates to an apparatus comprising a device (column) for phase contact between a liquid phase and a gaseous phase as described above, and a floatable carrier on which the device is arranged.

Accordingly, it is provided that the device is arranged on a floating carrier, in particular in the form of a vessel or a platform.

The tray or the trays of the device or column according to the invention can, of course, also be considered per se the subject of the invention (without surrounding shell and such column parts) and accordingly can be the subject of an independent claim.

BRIEF DESCRIPTION OF THE DRAWINGS

Further advantages, features and examples of the present invention shall be explained by the following figure descriptions of embodiments based on the Figures, wherein

In connection with FIG. 2, FIG. 1 shows a fragmentary view of a device 1 (e.g., column) according to the invention. The device 1 is used to bring about a phase contact between a liquid phase and a gaseous phase. To this end, the device 1 has a shell 10, which defines a shell space M, in which a large number of trays, in this case by way of example a first tray 100, are arranged above one another along the longitudinal axis L of the shell 10, which coincides with the vertical Z in a state of the device 1 that is arranged as directed.

Figure 1:
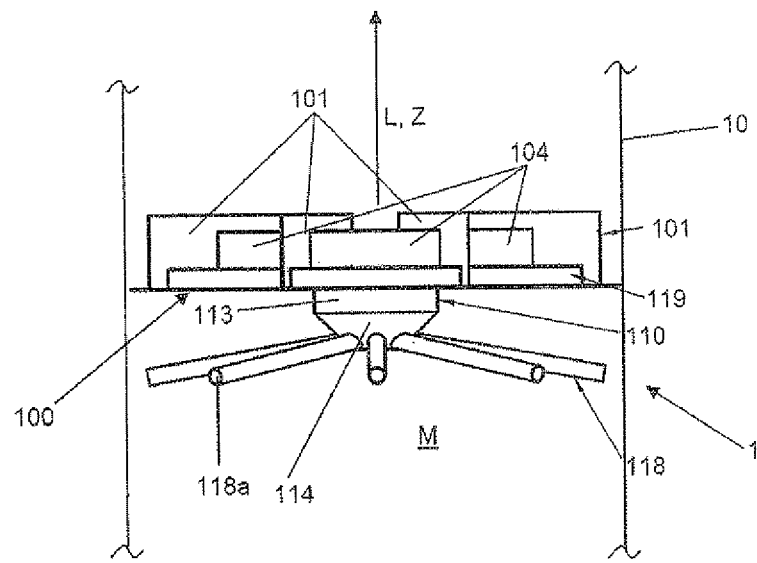
FIG. 1 shows a fragmentary sectional view of a device (column) according to the invention comprising at least one first tray for bringing about a phase contact between a gaseous phase and a liquid phase.

The at least one first tray 100 in this case is shaped like a disk and is arranged coaxially to the shell 10, whereby the first tray 100 extends crosswise to the longitudinal axis L. The first tray 100 has a large number of through openings D, through which a gaseous phase, introduced into the shell space M, can flow along the longitudinal axis L or vertical Z from the bottom to the top through the first trays 100. In countercurrent to this, the liquid phase is released onto the first tray 100 or wets the first tray 100, so that a froth or foam layer is formed on the at least one first tray 100, in which the gaseous phase and the liquid phase accompany an intensive phase contact.

In order to prevent an inclined position of the device or column 1 (the longitudinal axis L then forms an acute angle with the vertical Z), (a) causing the entire liquid phase to collect in the lowered area of the at least one first tray 100 and having drizzling (weeping) occurring there, and (b) causing the area of the first tray 100 raised by the inclined position to dry out, the first tray 100 or the froth or foam surface is divided using sealing weirs (dividing walls) 101 into several (pie-wedge-shaped) circular sectors 102. Two sealing weirs 101 that are adjacent or opposite one another bound such a sector 102. In this case, the sealing weirs 101 in each case extend along a radial direction R starting from a central area 110 of the first tray 100 to an outer circumferential edge 103 of the first tray 100, which extends around, along the shell 10 (cf. FIG. 8).

The number of sealing weirs 101 and thus the size of the individual sectors 102 are selected based on the column diameter and the vessel movements that are to be expected. The purpose is to preclude a drying-out of part of the tray within a sector 102 and thus prevent gas from breaking through. Usually, the sectors 102 are dimensioned so that a width (e.g., measured at the middle of the pie-shaped sector) of approximately 500 mm results, e.g., in a column 1 having a diameter of 3 m this would correspond to a division of the tray into eight sectors 102. In this case, the individual sectors 102 do not exchange any liquid among one another, i.e., the sealing weirs 101 are designed liquid-tight. The sealing weirs 101 can advantageously be structurally designed so that they can act as stiffeners to reinforce the tray 100 or may be designed to support a first tray 100 positioned above the sealing weir 101.

Figure 2:
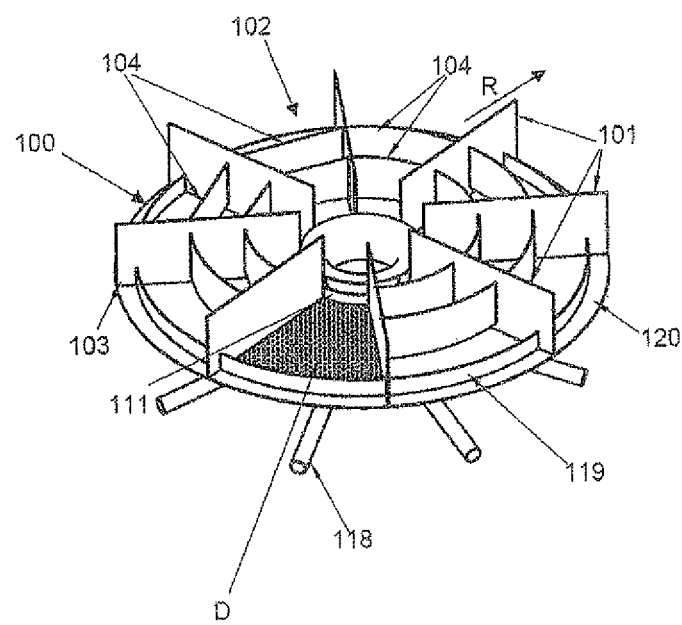
FIG. 2 shows a perspective view of the first tray shown in FIG. 1 wherein no underflow/through weirs are indicated in a sector for visualizing the material exchange elements.

To coat the at least one first tray 100, a feed or inlet weir 119 is provided, according to FIGS. 1 and 2, in the sector 102 in each case on the outermost circumferential edge 103 of the first tray 100, so that it extends from a sealing weir 101 of the respective sector 102 to the opposite sealing weir 101 of the sector 102 in question. The respective inlet weir 119 separates a feed area 120 from the respective sector 102. The feed area is coated with the liquid phase (e.g., from a subjacent tray), so that the liquid phase can flow over the inlet weir 119 and be distributed to the froth or foam surface in the respective sector 102. The inlet weirs 119 extend in each case crosswise to a direction of flow S of the liquid phase in the respective sector 102 (cf. FIG. 8). Thus, the inlet weirs 119 can extend concentrically with the shell 10 (cf., e.g., FIGS. 1 and 2) or parallel to a tangential direction T of the outer edge 103 of the first tray 100 (cf., e.g., FIG. 8).

Figure 10:
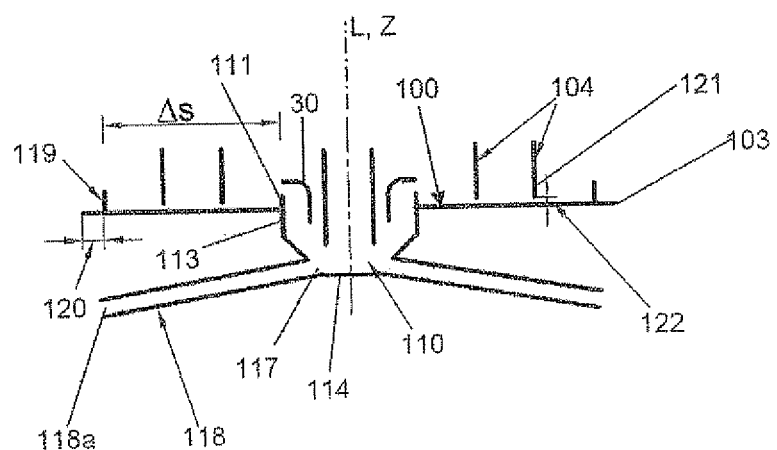
FIG. 10 shows a sectional view of a tray with a center downcomer.

In addition, to slow the liquid phase down more, perpendicular to the direction of flow S of the liquid phase (in FIGS. 1 and 2, flow S runs opposite to the radial direction R, i.e., from the shell 10 to the central area 110 of the at least one first tray 100), weirs 104 are arranged in the form of underflow weirs and/or through weirs, which also are arranged concentrically or tangentially (cf. FIGS. 8 and 18) relative to the column shell 10 or a tangential direction T (cf. FIG. 8) of the outer edge 103 of the first tray 100. These weirs 104 can be made from appropriately shaped sheets and are also referred to as "anti-motion baffles." According to FIG. 10, such sheets or weirs 104 each form a through opening 122 between a lower area 121 and the at least one first tray 100, in particular in the form of a gap. The liquid phase, on its way from the feed area (tray feed) 120 to a draining weir 111, via which the liquid phase passes to another (additional) tray placed below, must flow through this gap 122. In any inclined position, an unhindered, quick flowing of the liquid phase to a low point of the first tray 100 is thus impaired; the drying out of a higher tray area is accordingly delayed. Since it can be assumed from this that the vessel or a floating carrier moves continuously, the position of the at least one first tray 100 in the space also changes, and the local low point shifts continuously. A time delay of the liquid flow, owing to the hindering action of the weirs 104, therefore assists as a result in the uniform distribution of the liquid phase onto the at least one first tray 100.

Figure 11:
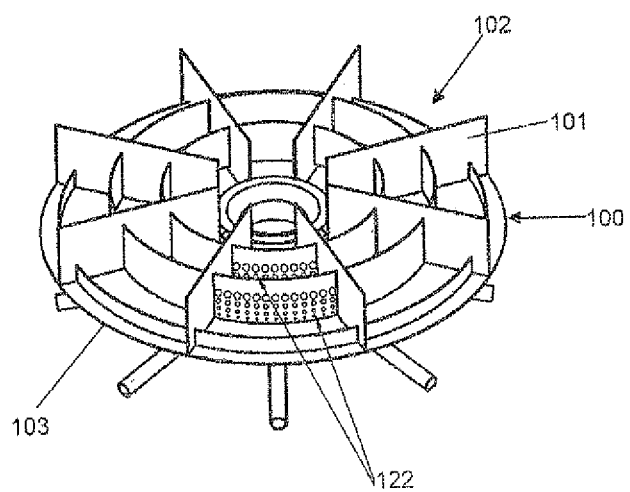
FIG. 11 shows a perspective view of a tray with a center downcomer and through weirs.

As alternatives to a gap 122 associated the respective weir (underflow weir) 104, a large number of through holes (through openings) 122 can also be provided (through weir 104). See FIG. 11. The number, diameter and position of the through holes 122 can vary in this case and are calculated according to the local conditions (e.g., column diameter, number of sectors, length of the flow path, liquid loading, vessel movement, position of the column 1 relative to the vessel's center of gravity, etc.), so that within a periodic deviation, a certain level difference of the liquid phase does not drop below a certain value. In particular, the diameter of the through holes 122, as shown in FIG. 11, can increase from the bottom to the top (along the longitudinal axis L).

To maintain a high degree of tray efficiency, it is essential that in all sectors 102, the same ratio of gaseous phase to liquid phase prevails. The uniform distribution of the gaseous phase is achieved by each sector 102 having the same number of exchange elements (e.g., chimney neck bells or bubble caps, valves, sieve holes, etc.).

According to FIGS. 18 to 21, in particular covered chimney necks 105 (chimney neck bells; bubble caps) are used as material exchange elements. The chimney necks in each case extend from a circumferential edge area 151 that borders the respective through opening D and, in this case, extend parallel to the longitudinal axis L. The chimney necks or risers 105 are in each case covered or enclosed by an assigned chimney cap 106 (the chimney neck and chimney cap forming a bubble cap). In each case, a lower edge area 107, via which the respective chimney cap 106 is connected to the assigned (first) tray 100, is provided with a large number of gas slots 108, whose upper edges 109 in each case, along the longitudinal axis L, are at a distance A to an upper edge 150 of the chimney neck 105 that is covered in each case. Preferably, the distance A or the length of the chimney neck 105 along the longitudinal axis L is dimensioned (e.g., a length of between approximately 50-150 mm) in such a way that, in any inclined position of the (first) tray 100 caused by the swell of the floating carrier system, a covering of the gas slots 109 of the chimney neck bells (bubble caps) 105, 106 with the liquid phase is ensured. Thus, a forced feeding of the gaseous phase through the liquid phase always takes place, and a drizzling of the liquid phase is avoided.

Figure 22:
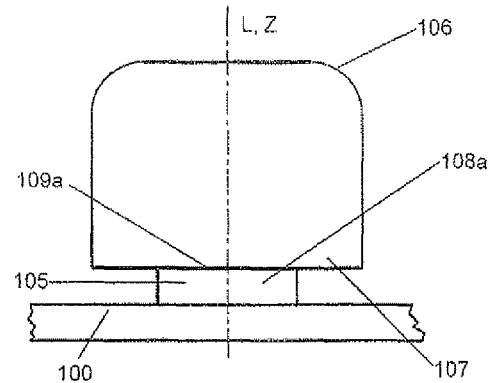
Figure 23:
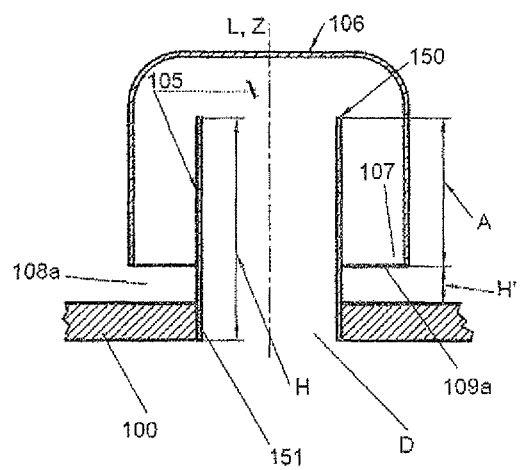
Figure 24:
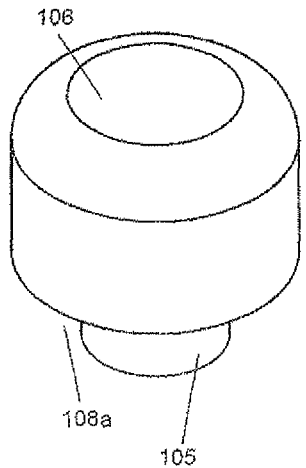

As an alternative to the gas slots 108, according to FIGS. 22 to 24, on the lower circumferential edge area 107 of the respective chimney cap 106, a circumferential gas slot 108a can be provided, which is bounded by the edge area 107 as well as the assigned (first) tray 100. In this case, the gas gap 108a has a height H' above the (first) tray 100 along the longitudinal axis Z. The upper edge 109a (relative to the longitudinal axis L or vertical Z) of the gas gap 108a is a distance A from the upper edge 150 of the assigned chimney neck 105. Preferably, the distance A or the length of the chimney neck 105 along the longitudinal axis L is in turn dimensioned (e.g., a length of between approximately 50-150 mm) so that in the case of any inclined position of the (first) tray 100, caused by the swell of the floating carrier system, a covering of the gas gap 108a with the liquid phase is ensured.

Figure 25:
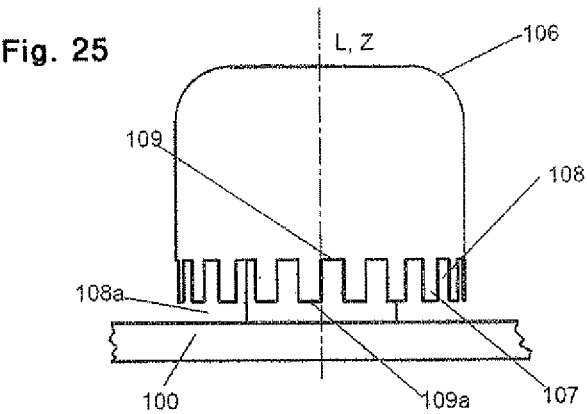
Figure 26:
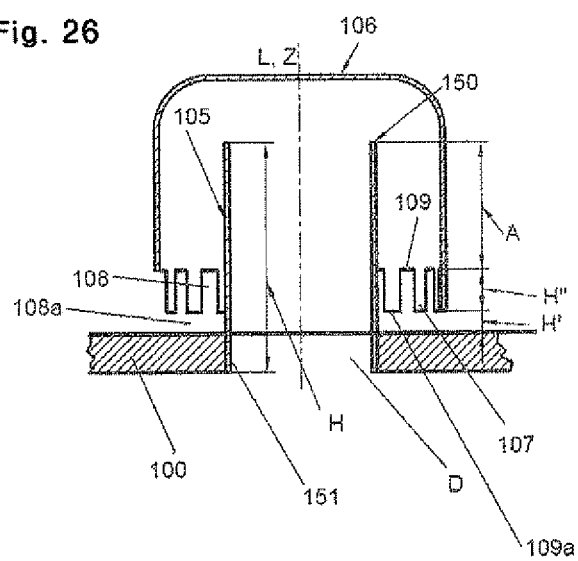
Figure 27:
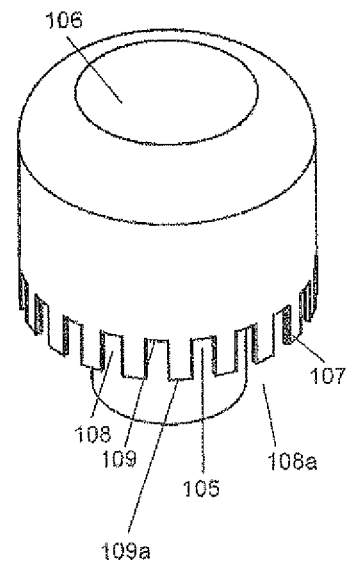

According to FIGS. 25 to 27, the chimney caps 106 can also have—in addition to a circumferential gas gap 108a according to FIGS. 22 to 24—one or more gas slots 108 formed on the respective lower edge area 107 and extended in each case along the longitudinal axis L or vertical Z (cf. FIGS. 19 to 21), so that the lower edge area 107 has a correspondingly jagged outline. In this case, the gas gap 108a or its upper edge 109a along the longitudinal axis L or vertical Z has a height H', while the upper edges 109 of the gas slots 108, moreover, have a height H'+H" above the assigned (first) tray 100. Also here, the distance A between the upper edges 109 and the upper edge 150 of the assigned chimney neck 105 is preferably dimensioned so that the above-described forced feeding of the gaseous phase through the liquid phase is ensured.

To distribute the liquid phase, a special center downcomer 110, modified because of the vessel movement, with an integrated liquid distributor can be used according to FIGS. 1-4, 10-11, 13-16 and 18 for the at least one first tray 100. On its upper end, the center downcomer 110 has a circumferential draining weir 111 that projects from the first tray 100, via which the liquid phase can flow from sectors 102 into the center downcomer 110. In addition to the original objects, such as, e.g., degassing and mixing of the liquid phase, the center downcomer 110 can also distribute the liquid phase uniformly to the individual sectors 102 of a tray 200. To this end, the center downcomer 110 is equipped with a number (or its multiple) of distribution openings 117 (see, e.g., FIG. 10) corresponding to the number of sectors 102. These distribution openings 117 that serve as apertures can be provided laterally on a circumferential wall 113 of the center downcomer 110 (cf., e.g., FIGS. 15 and 16) or on a shaft base 114 of the center downcomer 110 (cf., e.g., FIGS. 13 and 14). An especially advantageous constellation results when the distribution openings 117 in the shaft base 114 are placed in the middle or very near to the middle of the combination shaft fluid distributor/center downcomer 110. As a result, an approximately identical liquid pressure (independently of the inclined position of the column or device 1) acts on all distribution holes 117, and thus the amount of liquid that exits from the distribution holes 117 is almost the same. Thus, the uniform distribution of the liquid phase to all sectors 102 is ensured. This is obvious from, e.g., FIG. 14: the closer the distribution openings 117 are arranged to the middle of the shaft base 114 of the center downcomer 110, and the smaller the distances are between the distribution openings 117, the smaller the difference between the corresponding liquid levels h1, h2 via the distribution openings 117 and thus the difference between the pressures that act on the distribution openings 117. Thus, the amount of liquid that flows out from the distribution openings 117 is also almost the same, by which the same gas-liquid ratio can be achieved in the sectors 102. The design/geometry of the distribution openings 117 is calculated in particular according to the given conditions (e.g., liquid volumes, load range of the column 1, distance between trays, etc.). The distribution openings 117 can have a circular, rectangular, slot-shaped or any other configuration.

Depending on the design, the shaft depth of the center downcomer 110 can correspond to the distance of two trays 100, 200 or can be shortened. In the latter case, it is a raised shaft (so-called "truncated downcomer").

Depending on the design of the at least one first tray 100, distribution pipes 118 or channels (such as upwardly open channels) can be connected to the distribution openings 117 of the center downcomer 110, to direct the liquid phase to the feed areas 120 of a (second) tray 200 placed thereunder. This is provided in particular in the case of radial trays, in which an identically oriented liquid stream is present on all trays 100, 200 (e.g., from a column shell 10 to the middle of the column), whereby the center downcomer 110 is always arranged in the middle of the column.

The distribution pipes or channels 118 can simultaneously be used as static carrying elements (carriers) of the respective tray 100, 200, i.e., the distribution pipes can provide support for the tray above or below. To ensure an outflow of the liquid, even in the case of a maximum inclined position of the column 1, the distribution pipes or channels 118 have a corresponding tilt relative to the horizontal.

Figure 7:
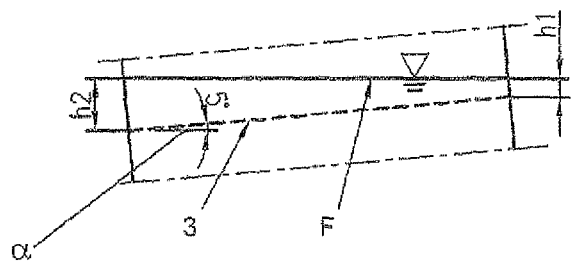

In connection with FIGS. 5-7 or 8 and 9, the advantages of the at least one first tray 100 in varying columns 1 are represented as follows:

If a conventional (1-flow) tray 3, which obtains the liquid phase (with level F) from a side shaft 4 (downcomer) and discharges the liquid phase via an opposite side shaft 2, tilts by an angle α of, e.g., 5° owing to the inclined position of a vessel, the liquid phase collects at the corresponding low point in the tray 3, as is shown in FIG. 7. The difference of the liquid level Δh at the lowest and highest points results can be determined by the following formula: $\Delta h = d^* \tan \alpha = h2 - h1$.

If a tray 100 in the form of a radial tray is used, the difference in the liquid level can be determined by the following formula: $\Delta h = \Delta s^* \tan \alpha = h2 - h1$. See FIGS. 8 and 9.

Figure 8:
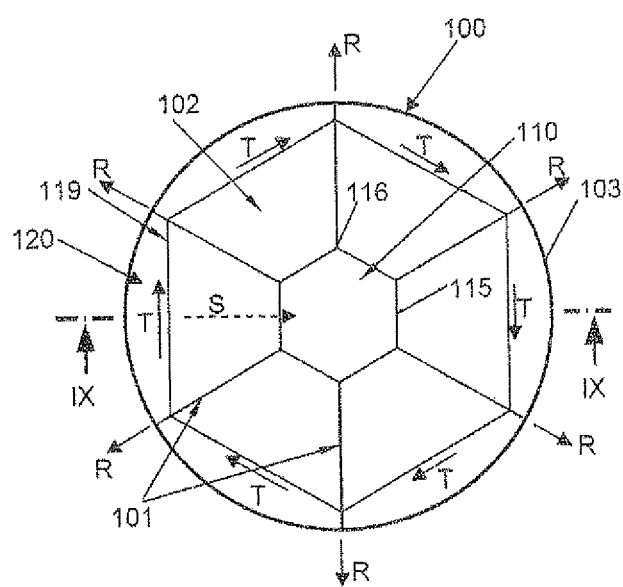
FIGS. 8-9 show diagrammatic sectional views of a variant of a tray according to the invention.
Figure 9:
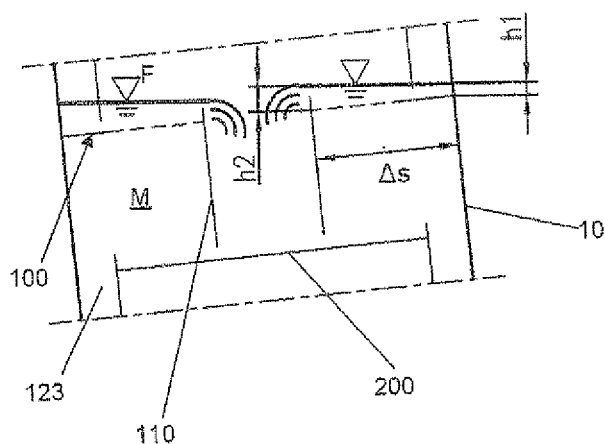

Since the length of the flow path Δs is only half the column diameter d/2 minus half the diameter of the center downcomer, a significantly smaller difference of the liquid levels to be set on a sector 102 results here. In addition, in a tray 100 as shown in FIGS. 8 and 9, in comparison to the 1-flow tray of FIGS. 5-7, the direction in which the column 1 is tilted does not matter since there exists a cylindrical symmetry relative to the longitudinal axis L. The radial tray 100 is therefore especially suitable for use in columns 1 in off-shore plants.

Figure 3:
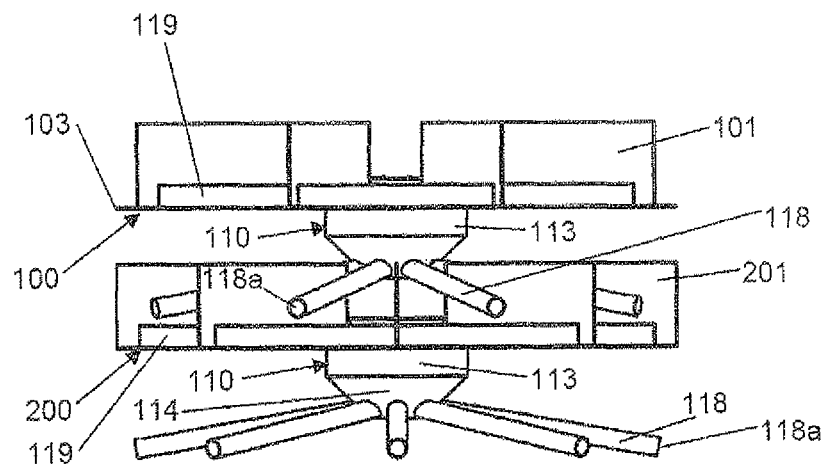
FIG. 3 shows two trays, arranged above one another, with a center downcomer in a side view.
Figure 4:
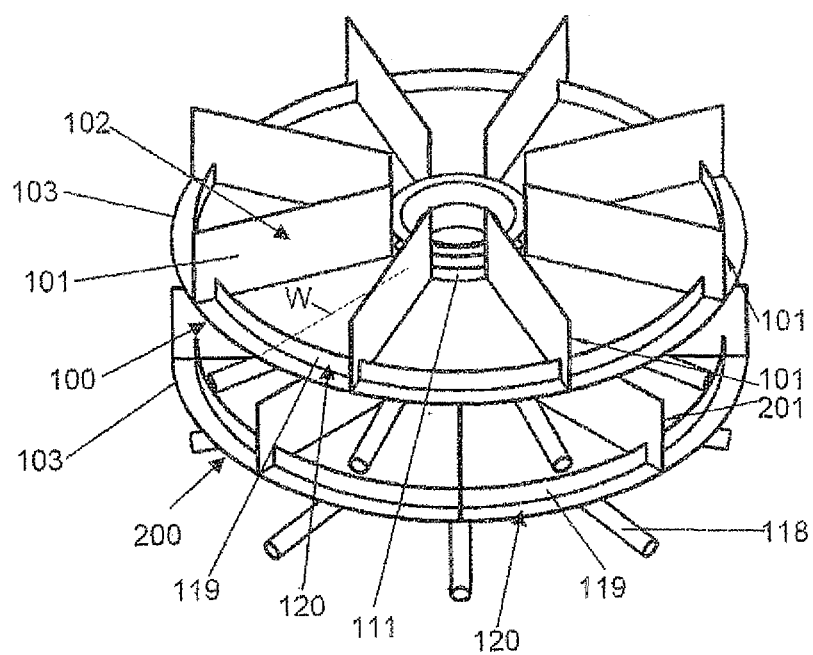
FIG. 4 shows the trays according to FIG. 3 with non-aligned sealing weirs in a perspective view.
Figure 5:
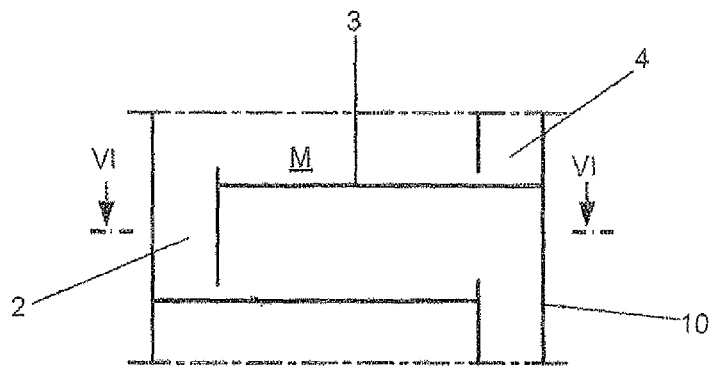
FIGS. 5-7 show diagrammatic sectional views of a 1-flow tray.
Figure 6:
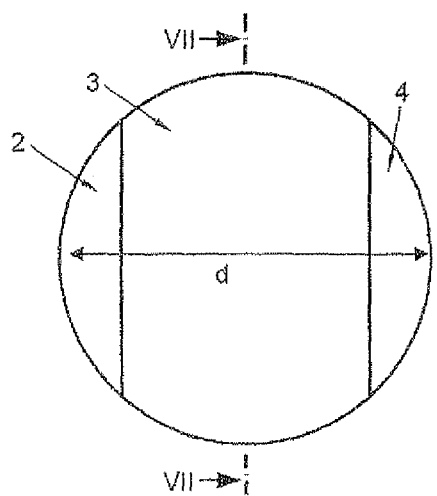

As indicated in FIGS. 3 and 4, multiple trays, e.g., an upper first tray 100 and a lower second tray 200, are, of course, arranged above one another in regular fashion along the longitudinal axis L. In this case, the two trays 100, 200 each can have a center downcomer 110 of the above-described type.

The distribution pipes 118 of the upper first tray 100 are in this case arranged with their free ends 118a—via which the liquid phase, flowing out through the center downcomer 110 of the at least one first tray 100, is discharged from the respective distribution pipe 118—above the feed areas 120 of the subjacent second tray 200.

Figure 12:
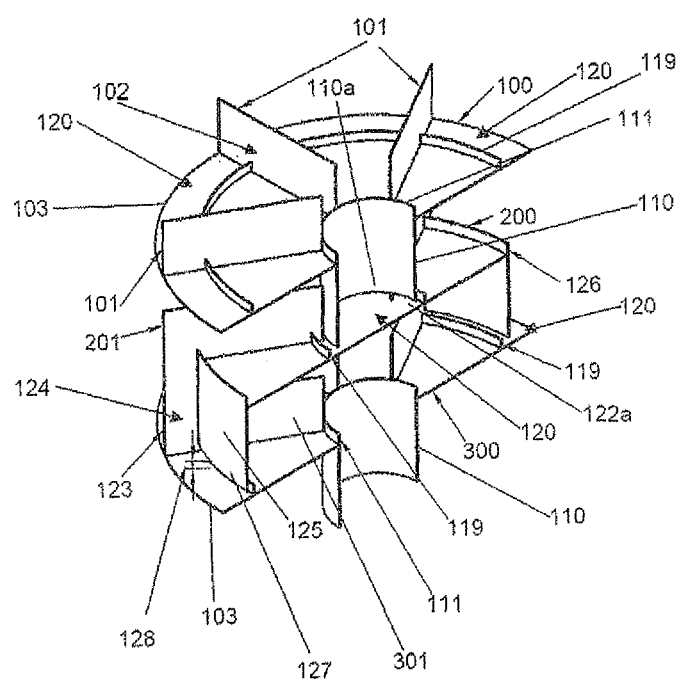
FIG. 12 shows a perspective, cut view of three trays arranged above one another with a center downcomer and an outside downcomer.
Figure 13:
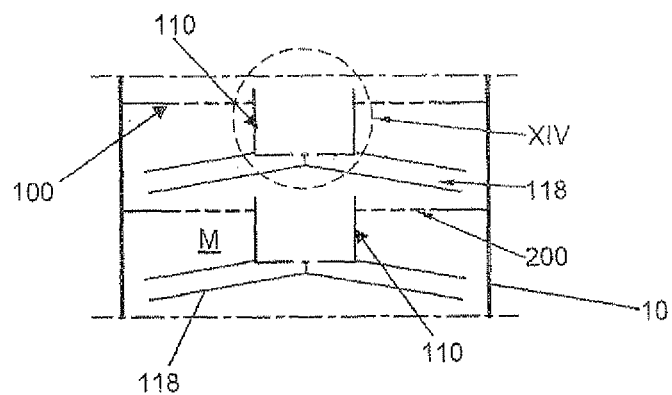
FIGS. 13-14 show sectional views of the distribution holes of a center downcomer.
Figure 14:
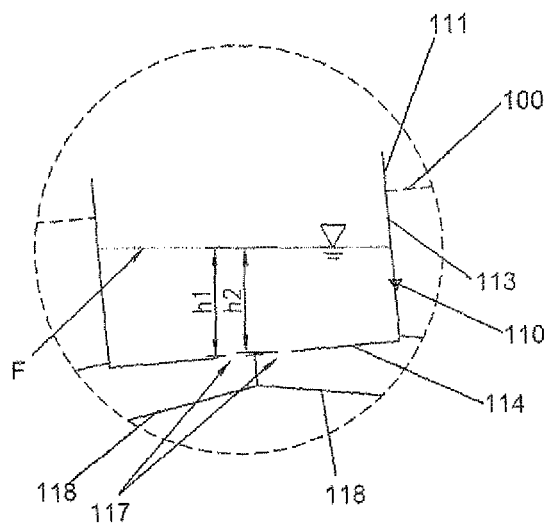

The position of the sealing weirs 101, 201, 301 of trays 100, 200, 300 lying one on top of another can vary as shown in FIG. 12 or be offset at a certain angle. It is especially advantageous when the respective sealing weir 101, 201 according to FIG. 4 is positioned below (or above) an assigned bisector of the angle W of the sector 102 that is placed above (or below). Thus, the mixing of the gas between the tray sectors 102 is promoted.

Instead of a center downcomer 110, a tray 200 can also have an outside downcomer 123 according to FIG. 12 on an outer circumferential edge 103. In columns 1 with outside downcomer bases, in this case trays 100 with a center downcomer 110 and tray 200 with an outside downcomer 123 alternate. Thus, the column 1 according to FIG. 12 has at least one upper first tray 100 with a center downcomer 110, a second tray 200, arranged thereunder along the longitudinal axis L, with an outside downcomer 123, as well as a third tray 300 that is arranged thereunder along the longitudinal axis L, which in turn has a center downcomer 110. This sequence can be continued as needed.

The trays 100, 300 with a center downcomer 110 in each case have, as already explained above, a feed area 120 on an outer edge 103, which feed area is separated by a feed or inlet weir 119 from the respective rest of the section 102. The feed areas 120 in this case are each coated via an outside downcomer 123, arranged thereabove, of the tray 200 that is placed thereabove in each case. A tray with an outside downcomer 123 (second tray 200) in each case lies directly below a center downcomer 110, so that the liquid phase can drop from a center downcomer 110 directly onto the subjacent (second) tray 200 with an outside shaft (outside downcomer) 123. In this case, a gap 122a is located between a lower end of the respective center downcomer 110 and the subjacent (second) tray 200, through which gap the liquid phase can flow, whereby for storing or calming the liquid phase on the (second) tray 200, a inlet weir 119 extends around the gap 122a or the lower end 110a of the center downcomer 110. The liquid phase flows outwards towards the shell 10 and can then flow into the outside downcomer 123 via an outside downcomer wall 125, which forms a draining weir 126 on one upper end, which outside downcomer 123 is bounded by the outside downcomer wall 125 and the shell 10. In each case the outside downcomer wall 125 extends downwards along the longitudinal axis L towards the subjacent (third) tray 300 to a lower edge area 127. The shaft wall 125 ends below the level of the feed weir 119 of the (third) tray 300. Between the lower edge area 127 and the (third) tray 300, a through opening 128 is made in the form of a gap, whereby the liquid phase can flow via the respective through opening 128 from the outside downcomer 123 over the inlet weir 119 of the (third) tray 300, placed behind the outside downcomer wall 125, to the (third) tray 300.

According to FIG. 12, the sealing weirs 101, 201, 301 can be extended into the liquid draining shafts (outside downcomers 123), by which, in addition to the individual sectors 102, also individual outside downcomer segments 124 assigned to the sectors 102 are produced. This is primarily advantageous for outside downcomers 123, since here the liquid phase would very easily follow the movements of the vessel or floating carrier because of the annular space that would otherwise arise (risk of unequal liquid distribution from the shaft to the froth or foam surface). It is ensured by the sealing of the outside downcomer segments 124 that the liquid phase that is fed to the respective outside downcomer segment 124 from an assigned sector 102 is also fed again in the same amount to the subjacent sector 102. In this configuration, the respective center downcomer 110 would not be divided into sectors, by which a mixing of the liquid phase from the sectors 102 would occur and thus an evening out of the concentration would be ensured. In summary, the liquid phase is thus uniformly divided starting from the respective center downcomer 110 to the individual sectors 102 and then flows to the outside downcomer 123 divided into outside downcomer segments 124. In the subjacent (third) tray 300, the same amount of liquid in turn is distributed to the sectors 102 and the liquid phase from the sectors 102 can then be mixed together in the center downcomer 110.

Figure 15:
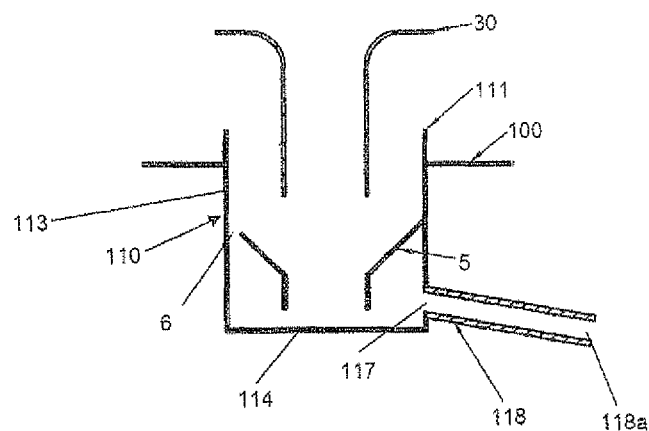
FIG. 15 shows a sectional view of a center downcomer with a feed hopper, energy brake, and vent opening.
Figure 16:
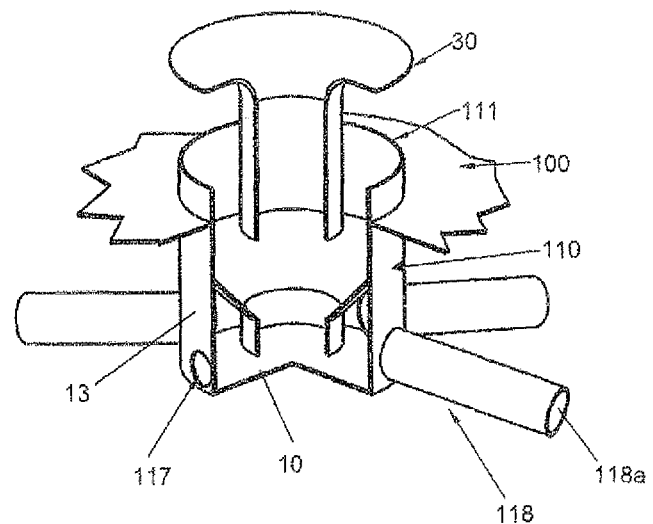
FIG. 16 shows a perspective view of the center downcomer according to FIG. 15.

To improve the degassing and mixing action as well as to increase the production efficiency, the respective center downcomer 110 according to FIGS. 15 and 16 can be equipped with special guide vanes (feed hoppers) 30 and/or degassing elements. These can be arranged in the entrance area of the respective center downcomer 110 or within the center downcomer 110. Thus, e.g., the shaft base 114 of a center downcomer 110 can have a hopper-shaped energy brake 5 for supporting the degassing of the liquid phase, whereby preferably at least one vent opening 6, through which gas entrained by the liquid phase can ascend, is provided preferably between an upper circumferential edge of the hopper 5 and the wall 113 of the center downcomer 110.

Figure 17:
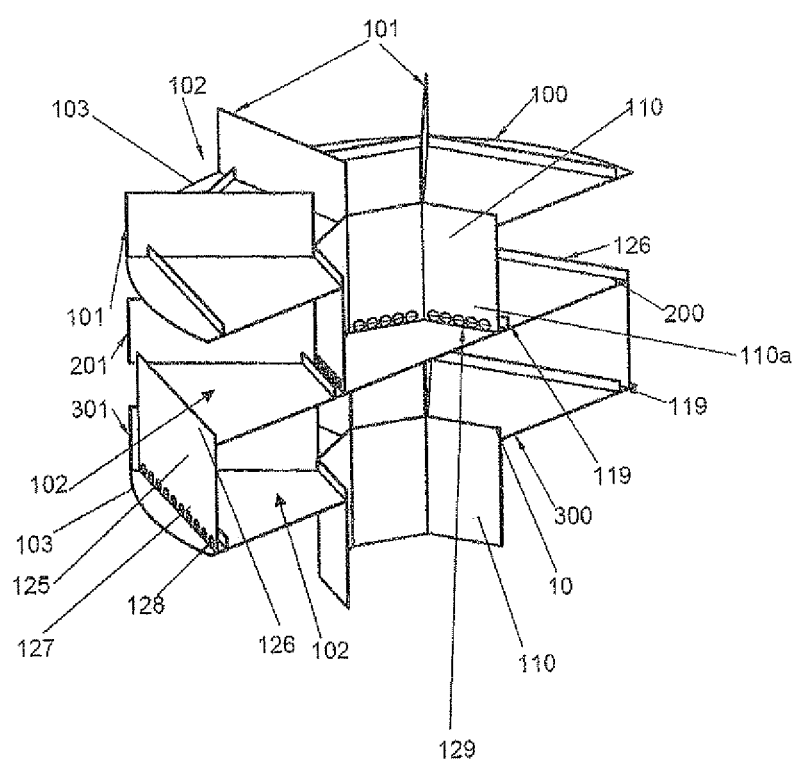
FIG. 17 shows trays arranged above one another depending on the type of FIG. 12 with tangential outside and center downcomer walls or weirs.

The center downcomer 110 of a tray 100 can have a cross-section that is concentric to the shell (column wall) 10 (cf., e.g., FIGS. 1 and 2) or can be designed corresponding to a polygon (cf. FIGS. 8 and 17). In the latter case, it is especially advantageous, because of the simpler design, for the number of sides or flat sections 115 of the center downcomer 110 corresponds to the number of sectors 102 of the respective tray 100, 300 (see FIG. 8). The corners 116 of the center downcomer 110 can then simultaneously be starting or ending points of the sealing weirs 101, 301.

In addition, according to FIG. 17, the outside downcomer walls 125 can be designed flat, i.e., tangential to the shell 10. Also, a large number of through openings 128 can be provided instead of a gap 128 on a lower edge area 127 of such an outside downcomer wall 125. Likewise, the gap 122a between a lower end 110a of a center downcomer 110 and the subjacent tray 200 according to FIG. 12 can also be replaced by a large number of through openings (through holes) 129.

Figure 18:
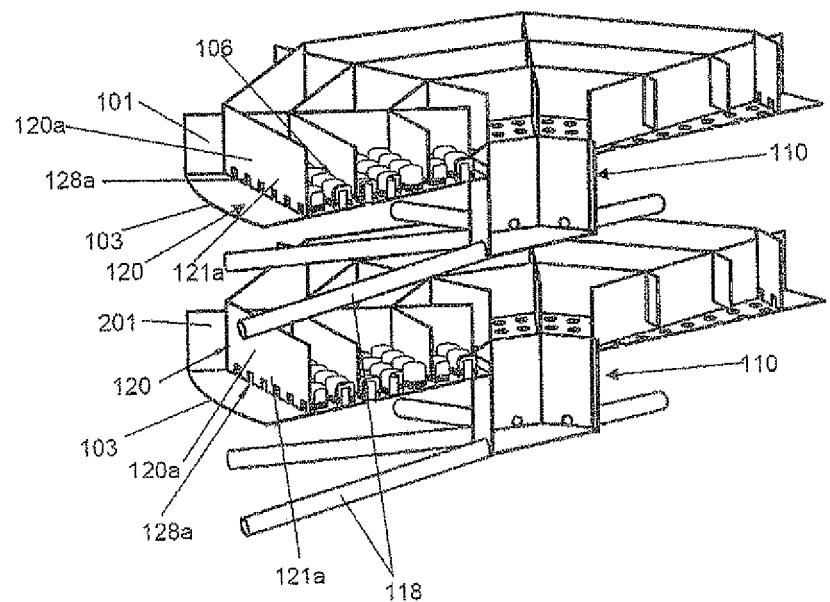
FIG. 18 shows two trays, arranged above one another, with "false downcomers"
Figure 19:
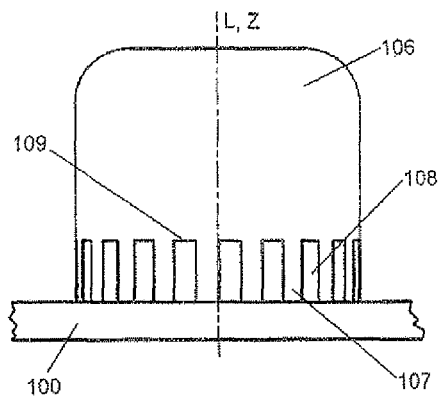
FIGS. 19-27 show views of chimney neck bells (e.g., bubble caps).
Figure 20:
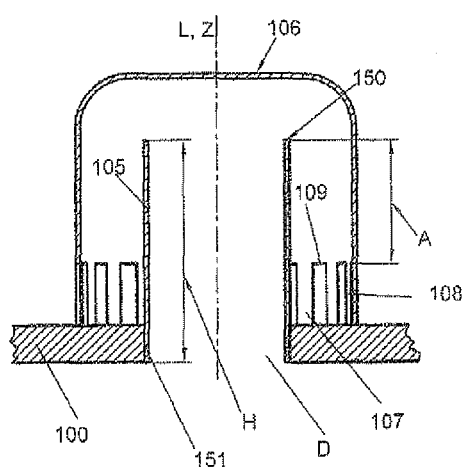
Figure 21:
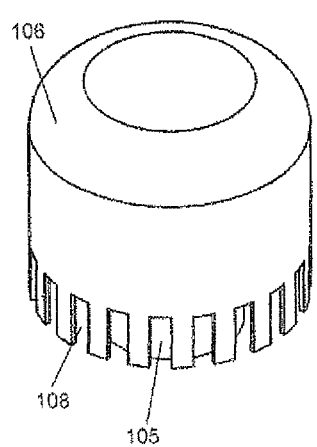

In addition to "normal" center downcomers 110 or outside downcomers 123, which guide the liquid phase from an upper tray 100 or 200 to the subjacent tray 200 or 300, in particular, according to FIG. 18 in each case the topmost tray 100 of a column 1 or a section that does not have any additional trays, moreover, can be equipped with a modified shaft (feed area) 120. Since the latter only consists of a tangential or concentric—relative to the shell 10—side wall (side sheet) 120a and through openings 128a or a gap, the latter is often referred to as a "false downcomer" according to the state of the art. This shaft 120 is used exclusively for uniform distribution of the liquid phase among the tray sectors 102. In the case of a 2-phase inflow, it can also support the degassing of the liquid phase.

In radial flow trays with co-current flow (the direction of flow of the liquid phase on the tray always runs from the column wall 10 to the middle) in off-shore use, the "false downcomer" can be used with through openings 128a in the form of slots or other openings on the tray 100, 200 in order to be able to supply the liquid phase uniformly to the respective trays 100, 200. See FIG. 18.

The above-described trays 100, 200, 300 (radial trays) in the above-mentioned configurations are suitable in particular for use in devices or columns 1 of off-shore plants. Despite a continuously present vessel movement or movement of a floating carrier of the column 1, a material exchange on this tray type is ensured. By use of all above-described elements, optionally a considerable increase in the output of a tray 100, 200, 300 can be achieved, by which optionally the column shell 10 can be minimized and thus the investment costs can be reduced. If a radial tray with a center downcomer 110 and pipe distributor 118 is used, a high degree of efficiency can be expected because the liquid is always guided in the same direction (from the shell 10 to the middle of the respective tray 100, 200, 300), and an equally high concentration gradient is always present between gas and liquid.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application No. 10 2011 117 588.5, filed Nov. 3, 2011, are incorporated by reference herein.

| Reference Symbol List | |
|---|---|
| 1 | Device or Column |
| 2, 4 | Side Shaft |
| 3 | 1-Flow Tray |
| 5 | Energy Brake |
| 6 | Vent Opening |
| 10 | Jacket or Shell |
| 30 | Guide Vane, Feed Hopper |
| 100, 200, 300 | Tray (Radial Tray) |
| 101, 201, 301 | Sealing Weir |
| 102 | Sectors |
| 103 | Outermost Edge |
| 104 | Weirs |
| 105 | Chimney Neck |
| 106 | Chimney Cap |
| 107, 127 | Lower Edge Area |
| 108 | Gas Slot |
| 108a | Gas Gap |
| 109, 150, 109a | Upper Edge |
| 110 | Center Downcomer |
| 110a | Lower End |
| 111, 126 | Draining Weir |
| 113 | Wall |
| 114 | Tray |
| 115 | Flat Sections (Sides) |
| 116 | Corners |
| 117 | Distribution Openings |
| 118 | Distribution Pipes |
| 118a | Free End |
| 119 | Feed Weir |
| 120 | Feed Area (Shaft) |
| 120a | Side Wall, Side Sheet |
| 121, 121a | Lower Area |
| D, 122, 122a, 128, 128a, 129 | Through Openings |
| 123 | Outside Downcomer |
| 124 | Outside Downcomer Segments |
| 125 | Outside Downcomer Wall |
| 151 | Edge Area |
| A | Distance |
| α | Angle |
| D | Through Openings |
| d | Shell or Tray Diameter |
| F | Level of the Liquid Phase |
| H, H', H" | Height |
| L | Longitudinal Axis |
| M | Shell Space |
| R | Radial Direction |
| S | Direction of Flow |
| T | Tangential Direction |
| h1, h2 | Heights |
| Δs | Length of Flow Path |
| W | Bisector of the Angle |
| Z | Vertical |

The invention claimed is:

1. A device for bringing about a phase contact between a liquid phase and a gaseous phase, said device comprising:
a shell (10), which extends along a longitudinal axis (L) and bounds a shell space (M),
at least one first tray (100), arranged in said shell space (M), for taking up a liquid phase, which extends crosswise to said longitudinal axis (L), wherein said at least one first tray (100) has through openings (D) for passage of a gaseous phase, so that a gaseous phase can come into phase contact with a liquid phase that is located on said at least one first tray (100), and
a plurality of sealing weirs (101) projecting from said at least one first tray (100) along said longitudinal axis (L), which extend in each case along a radial direction (R) of said at least one first tray (100), so that said at least one first tray (100) is divided into a corresponding plurality of sectors (102),
wherein each of said sealing weirs (101) extend in said radial direction (R) starting from a middle area of said at least one first tray (100) to an outermost circumferential edge (103) of said at least one first tray (100), so that over the entire length of each sealing weir, a liquid phase located in one of said sectors (102) cannot pass directly into adjacent sectors.

2. The device according to claim 1, wherein at least one weir (104) is arranged in each of said sectors (102), whereby said at least one weir (104), in each case, extends crosswise to a direction of flow (S) of a liquid phase in the respective sector (102).

3. The device according to claim 1, wherein said at least one first tray (100) is designed as a sieve tray.

4. The device according to claim 1, wherein said at least one first tray (100) has a center downcomer (110) that is positioned in the middle of said at least one first tray (100) and is bordered by a circumferential outlet weir (111) that projects from said at least one first tray (100), and wherein each of said sealing weirs (101) extends in a radial direction (R) from said circumferential outlet weir (111) to an outermost circumferential edge (103) of said at least one first tray (100).

5. The device according to claim 4, wherein said center downcomer (110) has a circumferential wall (113) extending along said longitudinal axis (L) and a downcomer base (114) that bounds said center downcomer (110) downward, and said center downcomer (110) has a circular or a polygonal cross-sectional shape.

6. The device according to claim 4, wherein said center downcomer (110) has a plurality of distribution openings (117), via which a liquid phase can be transferred from said downcomer (110) onto a second tray (200) arranged below said at least one first tray (100) in said shell space (M).

7. The device according to claim 6, wherein distribution pipes or channels (118) are connected to said distribution openings (117) for distributing a liquid phase onto said second tray (200) arranged below said at least one first tray (100), wherein said distribution pipes or channels (118) extend from said center downcomer (110) in each case radially outwards towards said shell (10).

8. The device according to claim 1, wherein in each of said sectors (102), an inlet weir (119) or a side wall (120a) is provided on an outermost circumferential edge (103) of said at least one first tray (100), wherein said inlet weir (119) or side wall (120a) separates a feed area (120) of said at least one first tray (100) from said respective sector (102), whereby said respective sector (102) can be coated with a liquid phase via said feed area (120), and wherein each of said inlet weirs (119) or side walls (120a) extends crosswise to a direction of flow (S) of a liquid phase into said respective sector (102).

9. The device according to claim 1, wherein said at least one first tray (200) has a circumferential outside downcomer (123) along the shell (10), via which a liquid phase can flow to a second tray (300) arranged below said at least one first tray (200), and wherein said outside downcomer (123) is divided by said sealing weirs (201) into outside downcomer segments (124) bounded by said shell (10) and an outside downcomer wall (125), wherein each of the outside downcomer walls (125) extends either concentrically with said shell (10) or extends parallel to a tangential direction (T) of an outermost circumferential edge (103) of said at least one first tray (200).

10. The device according to claim 1, further comprising a circular second tray (200), arranged in said shell space (M) below and adjacent said at least one first tray (100), which extends crosswise to said longitudinal axis (L), said second tray having through openings (D) for passage of a gaseous phase, whereby a gaseous phase can come into phase contact with a liquid phase located on said second tray, said second tray having a plurality of sealing weirs (201) projecting from said second tray along said longitudinal axis (L) and extending along a radial direction (R) of said second tray, so that said second tray is divided into a corresponding plurality of sectors, and wherein said at least one first tray (100) has a center downcomer (110) and said second tray (200) has an outside downcomer (123).

11. The device according to claim 10, wherein said sealing weirs (101) of said at least one first tray (100) in each case align with an assigned sealing weir (201) of said second tray (200).

12. An apparatus comprising a device according to claim 1 and a floatable carrier, wherein said device (1) is arranged on said floatable carrier, and said floatable carrier is a vessel or a platform.

13. The device according to claim 2, wherein said at least one weir (104), in each case, extends concentrically to said shell (10).

14. The device according to claim 2, wherein said at least one weir (104), in each case, extends parallel to a tangential direction (T) of an outermost circumferential edge (103) of said at least one first tray (100).

15. The device according to claim 2, wherein said at least one weir (104), in each case, is designed as an underflow weir.

16. The device according to claim 2, wherein said at least one weir (104), in each case, is designed as a through weir.

17. The device according to claim 2, wherein said at least one weir (104), in each case, is designed as an underflow weir and a through weir.

18. The device according to claim 1, wherein each of said through openings (D) of said at least one first tray (100) has associated therewith a chimney neck (105) that extends around the corresponding through opening (D) from the edge areas (151) bordering said corresponding through opening (D), each of the chimney necks (105) having being covered by an associated chimney cap (106), each of the chimney caps (106) having a lower circumferential edge area (107),
wherein said lower circumferential edge area (107) of each chimney cap (106) has a plurality of gas slots (108) through which a gaseous phase can be introduced via the respective chimney neck (105) into a liquid phase that stands on said at least one first tray (100), and/or said lower circumferential edge area (107) and said at least one first tray (100) define a circumferential gas gap (108*a*) through which a gaseous phase can be introduced via the respective chimney neck (105) into a liquid phase that stands on said at least one first tray (100).

19. The device according to claim 18, wherein said lower circumferential edge area (107) of each chimney cap (106) has a plurality of gas slots (108) through which a gaseous phase can be introduced via the respective chimney neck (105), and each of said gas slots (108) having an upper edge (109) and each of said chimney necks (105) having an upper edge (150), and the upper edges (109) of said gas slots (108) are a predefined distance along said longitudinal axis (L) from the upper edges (150) of said chimney necks (105), whereby, at least up to a predefinable maximum inclined position of said at least one first tray (100) relative to the horizontal, said gas slots (108) during operation of the device (1) are covered with a liquid phase.

20. The device according to claim 18, wherein said lower circumferential edge area (107) and said at least one first tray (100) define a circumferential gas gap (108*a*) through which a gaseous phase can be introduced via the respective chimney neck (105), and each of said circumferential gas gaps (108*a*) having an upper edge (109*a*) and each of said chimney necks (105) having an upper edge (150), and the upper edges (109*a*) of said circumferential gas gaps (108*a*) are a predefined distance along said longitudinal axis (L) from the upper edges (150) of said chimney necks (105), whereby, at least up to a predefinable maximum inclined position of said at least one first tray (100) relative to the horizontal, said gas slots (108) during operation of the device (1) are covered with a liquid phase.

21. The device according to claim 5, wherein said center downcomer (110) has a cross-sectional polygonal shape and said circumferential wall (113) has flat sections (115) corresponding to the sides of the polygonal shape, wherein adjacent flat sections (115) are connected to one another to form a corner (116) of said circumferential wall (113) extended along said longitudinal axis (L), and each of said sealing weirs (101) extends in a radial direction (R) from a corner (116) of said circumferential wall (113) to an outermost circumferential edge (103) of said at least one first tray (100).

22. The device according to claim 6, wherein said center downcomer (110) has a circumferential wall (113) extending along said longitudinal axis (L) and a shaft base (114) that bounds said center downcomer (110) downward, and wherein said distribution openings (117) are positioned in said circumferential wall (113) or in said shaft base (114) of said center downcomer (110).

23. The device according to claim 7, wherein said distribution pipes or channels (118) are tilted so that in each case they descend towards said shell (10).

24. The device according to claim 8, wherein each of the inlet weirs (119) or side walls (120*a*) extends concentrically with said shell (10).

25. The device according to claim 8, wherein each of the inlet weirs (119) or side walls (120*a*) extend parallel to a tangential direction (T) of an outermost circumferential edge (103) of said at least one first tray (100).

26. The device according to claim 1, wherein in each of said sectors (102) is provided with said side wall (120*a*) and each of the side walls (120*a*) has a lower area (121*a*) that is provided with a plurality of through openings (128*a*) for distributing a liquid phase in a respective sector (102) of said at least one first tray (100).

27. The device according to claim 9, wherein each of said outside downcomer walls (125) forms a draining weir (126) on an upper end thereof with said at least one first tray (200), whereby via said draining weir (126) a liquid phase can flow into the respective outside downcomer segment (124).

28. The device according to claim 9, wherein each of said outside downcomer walls (125) has at least one through opening (128) formed by a lower edge area (127) of the downcomer wall (125) and said second tray (300) arranged below said at least one first tray (200), whereby a liquid phase can flow from the respective outside downcomer segment (124) through said at least one through opening (128) to said second tray (300).

29. The device according to claim 27, wherein each of said outside downcomer walls (125) has at least one through opening (128) formed by a lower edge area (127) of the downcomer wall (125) and said second tray (300) arranged below said at least one first tray (200), whereby a liquid phase can flow from the respective outside downcomer segment (124) through said at least one through opening (128) to said second tray (300).

30. The device according to claim 1, further comprising a circular second tray, arranged in said shell space (M) below said at least one first tray, which extends crosswise to said longitudinal axis (L), said second tray having through openings (D) for passage of a gaseous phase, whereby a gaseous phase can come into phase contact with a liquid phase located on said second tray, said second tray having a plurality of sealing weirs projecting from said second tray along said longitudinal axis (L) and extending along a radial direction (R) of said second tray, so that said second tray is divided into a corresponding plurality of sectors, and wherein said at least one first tray (100) has an outside downcomer (123) and said second tray (300) has a center downcomer (110).

31. The device according to claim 1, further comprising a circular second tray, arranged in said shell space (M) below said at least one first tray, which extends crosswise to said longitudinal axis (L), said second tray having through openings (D) for passage of a gaseous phase, whereby a gaseous phase can come into phase contact with a liquid phase located on said second tray, said second tray having a plurality of sealing weirs projecting from said second tray along said longitudinal axis (L) and extending along a radial direction (R) of said second tray, so that said second tray is divided into a corresponding plurality of sectors, and wherein said at least one first tray (100) said second tray (200) both have a center downcomer (110).

32. The device according to claim 10, wherein said sealing weirs (101) of said at least one first tray (100) are arranged offset to said sealing weirs (201) of said second tray (200).

33. The device according to claim 32, wherein said sealing weirs (201) of said second tray (200) are each arranged along the bisector of the angle (W) of a subjacent sector (102) of said at least one first tray (100).

* * * * *